Figure 9:
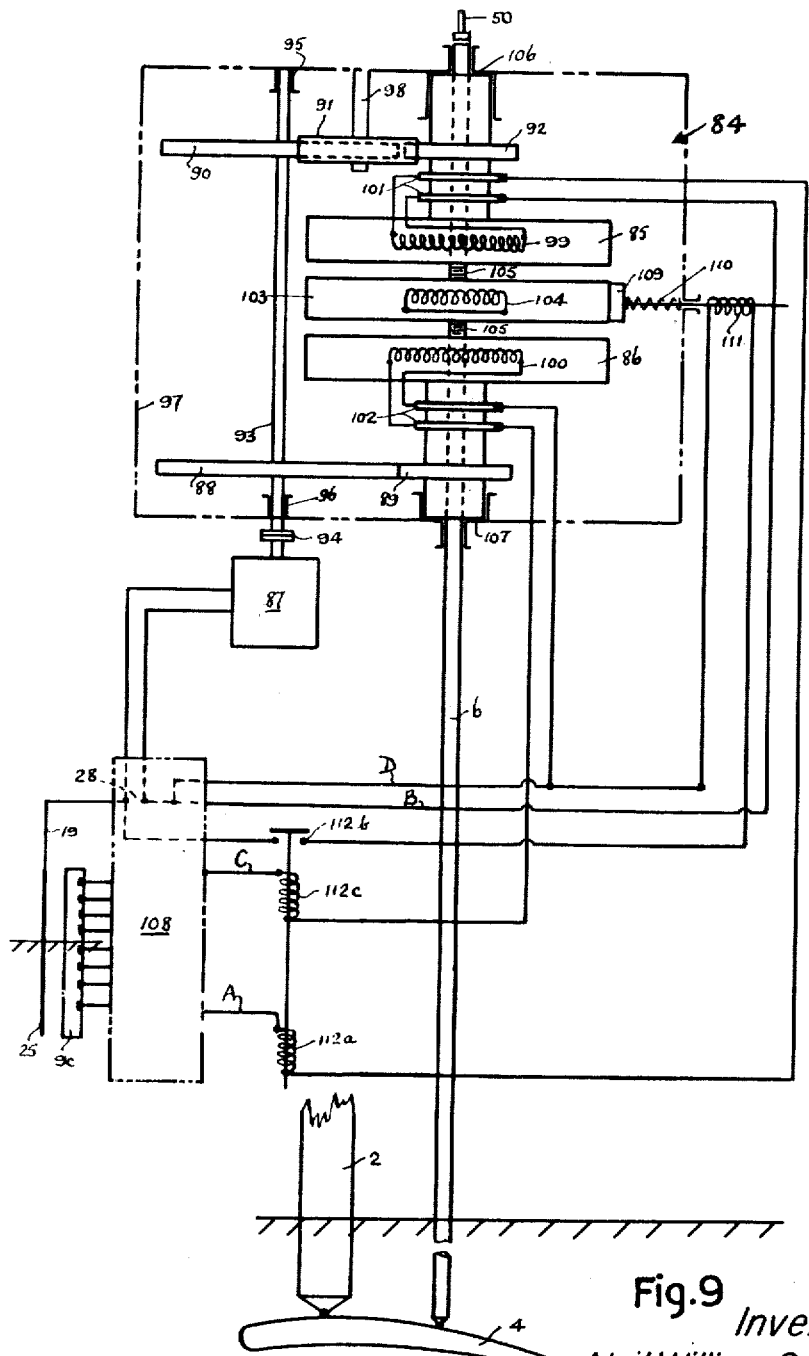

Nov. 27, 1951     N. W. GARDINER     2,576,716
HYDROFOIL BOAT
Filed Nov. 9, 1948                        9 Sheets-Sheet 1
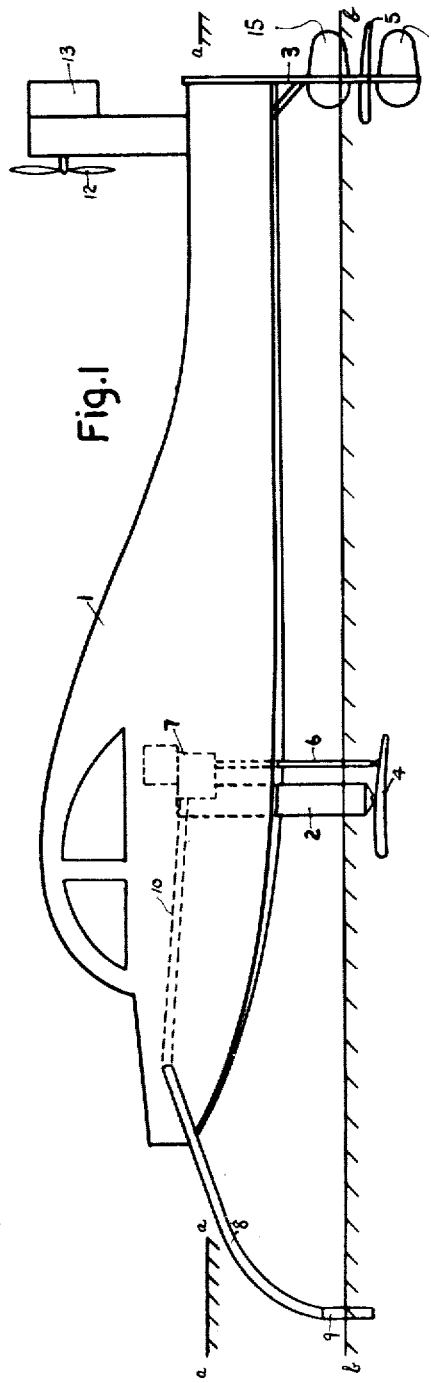
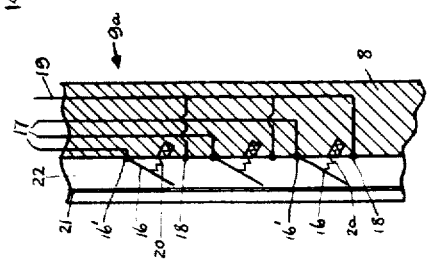
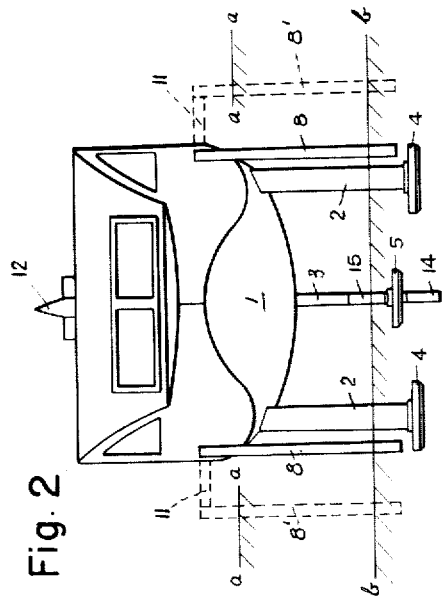
*Inventor*
*Neil William Gardiner*
By his attorneys
*Howson and Howson*

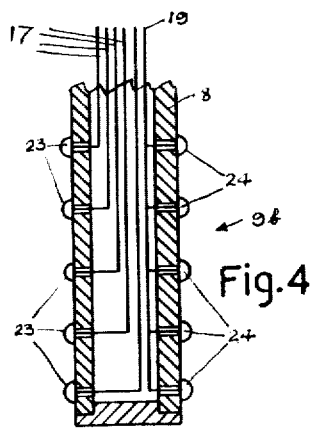
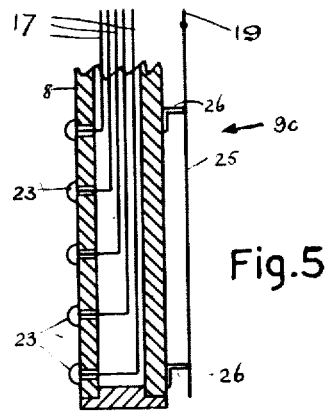
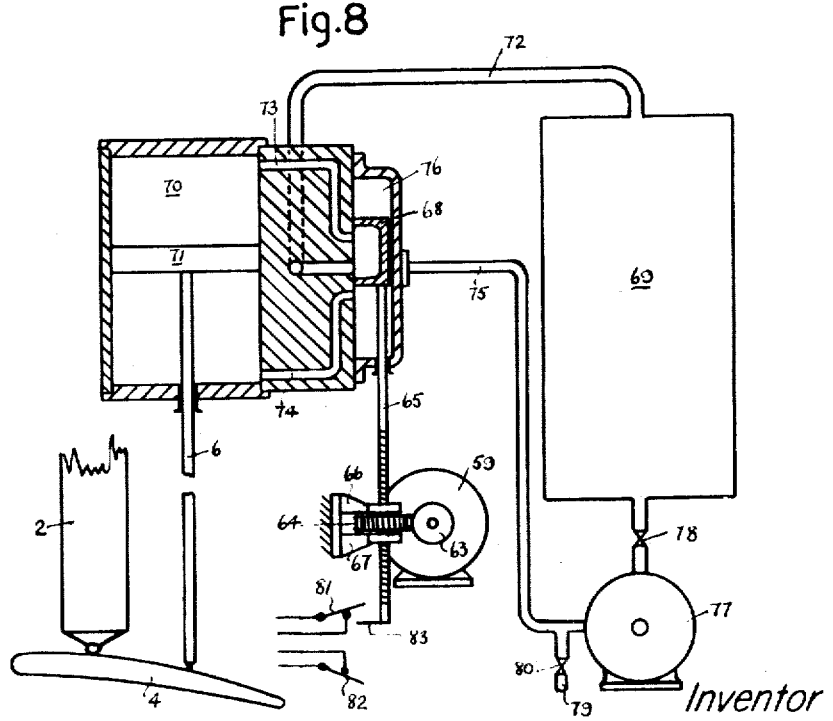

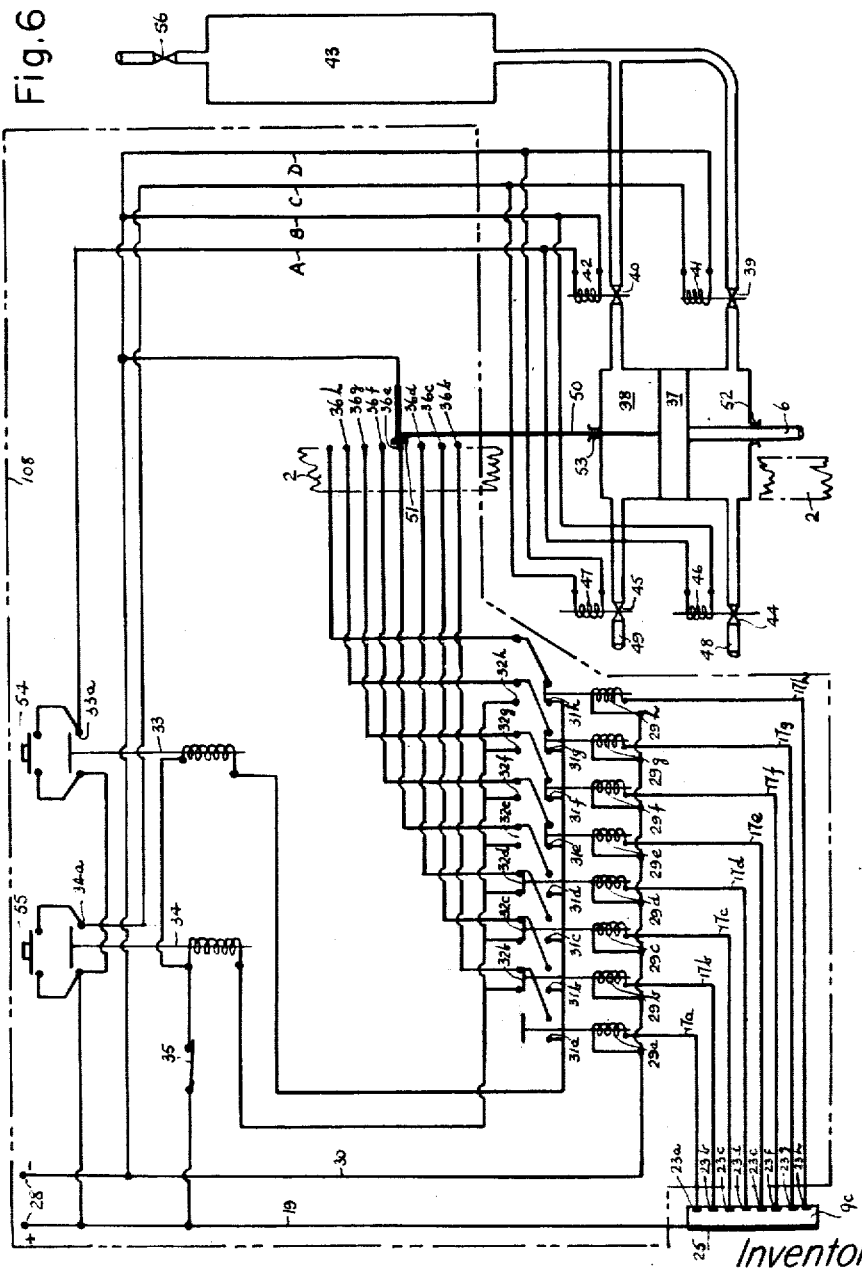

Nov. 27, 1951 N. W. GARDINER 2,576,716
HYDROFOIL BOAT
Filed Nov. 9, 1948 9 Sheets-Sheet 4
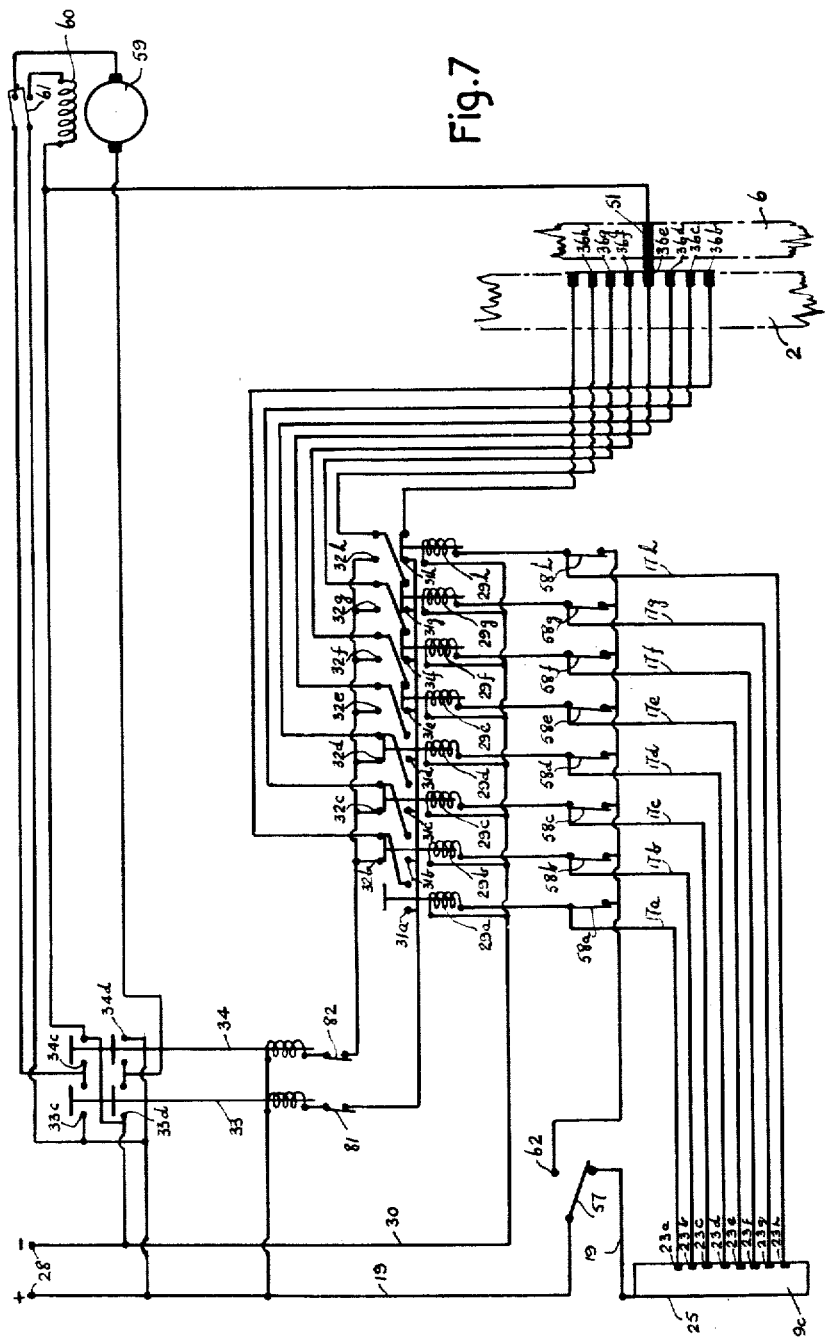
Inventor
Neil William Gardiner
By his attorneys
Howson and Howson Nov. 27, 1951  N. W. GARDINER  2,576,716
HYDROFOIL BOAT
Filed Nov. 9, 1948  9 Sheets-Sheet 6

Inventor
Neil William Gardiner
By his attorneys
Howson and Howson

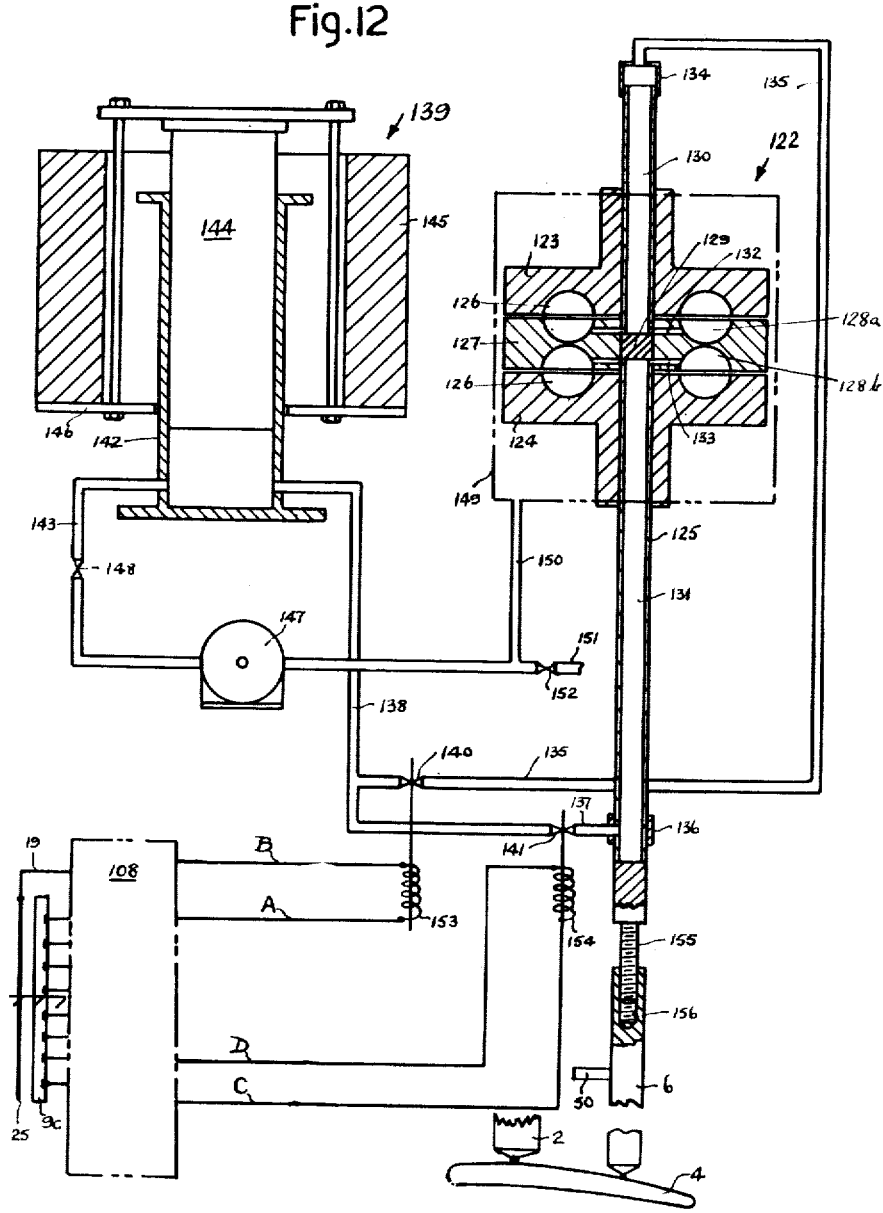

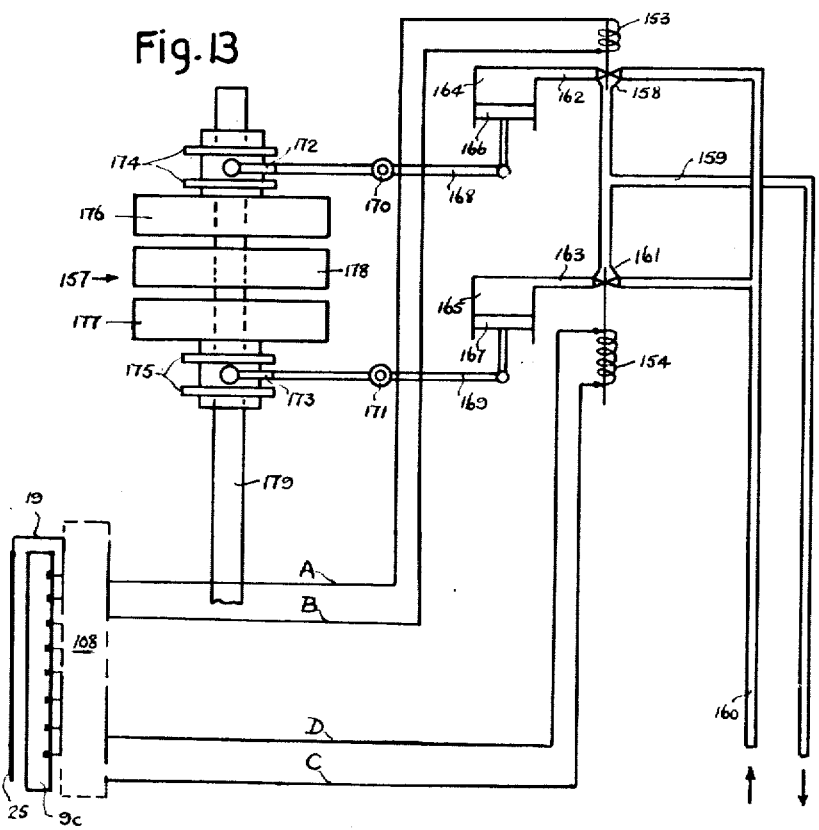
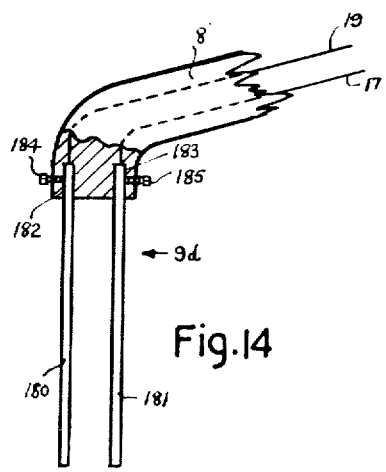
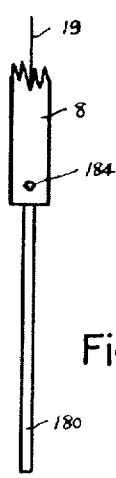

Patented Nov. 27, 1951

2,576,716

UNITED STATES PATENT OFFICE 2,576,716

HYDROFOIL BOAT

Neil William Gardiner, Great Auclum,
Burghfield Common, England

Application November 9, 1948, Serial No. 59,135
In Great Britain November 12, 1947

40 Claims. (Cl. 114—66.5)

This invention relates to an improvement in the control of hydrofoil boats, which are high speed craft adapted to travel on the surface of the water and which are provided with submerged hydrofoils or supporting fins inclined at a suitable angle of incidence so that upon the craft attaining a pre-determined speed it is supported above its normal floating position at a distance above the water surface by the lift due to the inclined hydrofoils.

It has already been proposed, in craft of this kind having one or more adjustable hydrofoils disposed in the vicinity of the forepart or bow, to provide a control plane for each hydrofoil which floats on or skims along the surface of the water and is disposed ahead of the hydrofoil controlled by it, each hydrofoil being pivotally connected to a strut fixed relatively to the craft and each control plane being connected to its hydrofoil in such a manner that the angle of attack of the latter is increased the more deeply it becomes submerged. In the known arrangement each control plane consists of a jockey arm pivotally mounted to the craft and connected through a suitable mechanical linkage to its associated hydrofoil.

The object of the above mentioned control planes is to predict the wave formation ahead of the craft and to vary the angle of attack of the hydrofoils in such a manner that the craft rides over the waves as it meets them.

The disadvantage of the known system of water surface prediction is the vulnerability of the jockey arms for which any retraction mechanism would be difficult to design on account of the mechanical linkage connecting them to the hydrofoils. Furthermore the control planes are liable to bump and bounce on the waves at speed causing vibration and noise in the craft.

The object of the present invention is the provision of means for varying the angle of incidence of the hydrofoils and for predicting their optimum incidence which do not suffer from the above mentioned disadvantage.

According to the present invention means for varying the angle of attack of hydrofoils of hydrofoil craft comprises electrical predictor means for predicting the water surface ahead of the craft, which predictor means, upon a change in level of the water surface relative thereto regulates a hydrofoil actuating mechanism, preferably housed within the craft, to vary the angle of attack of one or more of the said hydrofoils to cause the craft to follow the undulations of the water surface.

Preferably a separate predictor means is provided for each forward hydrofoil which is situated in line ahead of its respective hydrofoil. There is a separate hydrofoil actuating mechanism for each predictor means which controls the hydrofoil or hydrofoils associated with the predictor.

Figure 10:
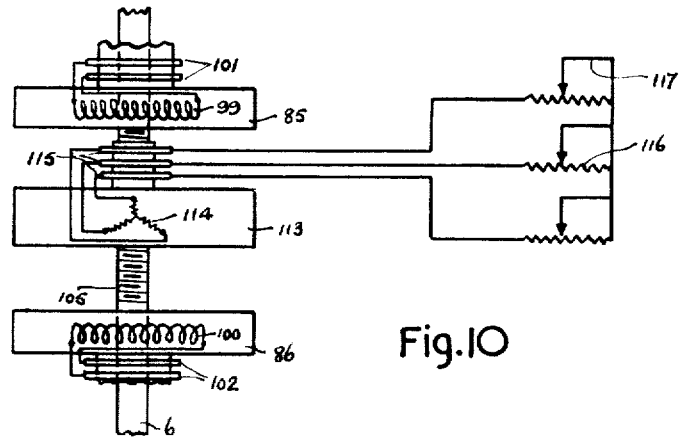
Figure 11:
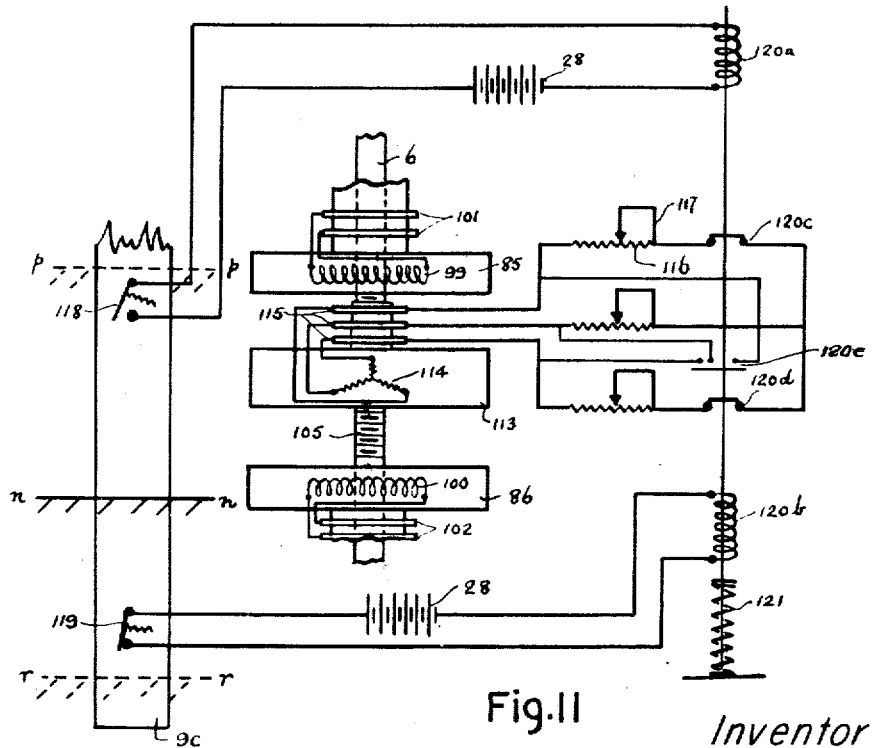
Figure 16:
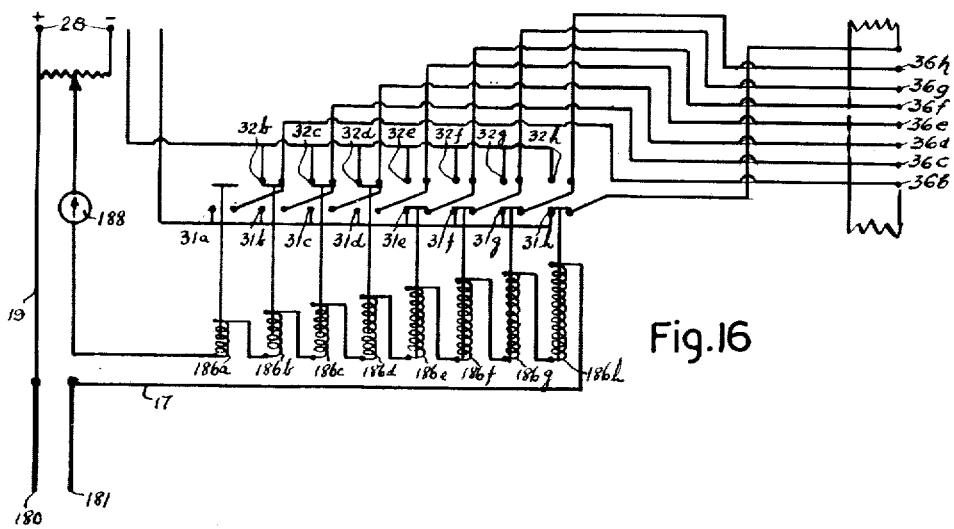

Various embodiments of the invention will now be described with reference to the accompanying drawings in which, Figure 1 is a schematic side elevation of a hydrofoil craft according to the invention, Figure 2 is a front view of the craft according to Figure 1, Figure 3 is a sectional side elevation of part of one form of predictor means, Figure 4 is a sectional front elevation of part of a second form of predictor means, Figure 5 is a sectional side elevation of part of a third form of predictor means, Figure 6 is a circuit diagram showing the combination of any of the predictor means according to Figures 3, 4 or 5 with a hydraulically operated hydrofoil actuating mechanism, Figure 7 is a circuit diagram showing the combination of any of the predictor means according to Figures 3, 4 or 5 with a hydrofoil actuating mechanism comprising a reversible electric motor, Figure 8 is a schematic sectional view of a modification of the hydrofoil actuating mechanism according to Figure 7, Figure 9 illustrates diagrammatically a kinetic energy actuator comprising an electric slip coupling, Figure 10 shows a modification of the arrangement according to Figure 9, Figure 11 shows a further modification of the arrangement according to Figure 9, Figure 12 illustrates diagrammatically a kinetic energy actuator comprising a hydraulic slip coupling, Figure 13 illustrates diagrammatically a kinetic energy actuator comprising a pneumatic clutch, Figure 14 is a side view of a further form of predictor means, Figure 15 is a front view of the predictor means according to Figure 14, Figure 16 shows the combination of the predictor means according to Figures 14 and 15 with a different form of hydrofoil actuating mechanisms.

Similar items in the various figures are designated with the same reference numerals.

Referring to Figures 1 and 2 the hydrofoil craft comprises a hull 1 which is adapted to float on the water when the craft is at rest, or travelling at slow speed, the approximate position of the water line under these conditions being indicated by the line a—a. In the vicinity of the bow of the craft are two vertically depending struts 2, one on each beam, rigidly secured to the hull 1. A centrally disposed vertically depending strut 3 is rigidly secured to the hull at the stern of the craft. Pivotally mounted to the lower extremity of each strut 2 is a hydrofoil 4, whilst a hydrofoil 5 is rigidly mounted with a positive angle of attack to the rear strut 3. The angle of attack of each of the forward hydrofoils 4 is controlled by an incidence command rod 6 pivotally connected to the hydrofoil and passing vertically upwards therefrom into the craft to a hydrofoil actuating mechanism generally designated 7. Various forms of construction of the hydrofoil actuating mechanism 7 will be described more fully hereinafter. Projecting forward rigidly from the bow of the craft are two predictor arms 8, one situated on each beam of the craft, which plunge into the water ahead of the bow. Upon these arms predictor means 9, more fully described hereinafter, are mounted. The electric wiring joining the predictor means 9 to the hydrofoil actuating mechanism 7 is led to the latter through the predictor arm 8 and a conduit 10. Instead of projecting directly from the hull 1 the predictor arms may be mounted as at 8' on supports 11 carried on each beam. When mounted in this manner the predictor means predict to some extent the variation in water level on either side of the hull and maintain lateral stability of the craft by suitably adjusting the angle of attack of the hydrofoils 4 in the manner more fully described hereinafter.

The craft may be powered by an airscrew 12 mounted at the stern and driven by a prime mover 13 or it may be provided with a water propeller.

When travelling at high speed the hull of the craft rises from the water and is supported in an elevated position by the hydrofoils 4, 5. The relative position of the water line under these conditions being indicated by the line b—b. Two rudders 14, 15 are preferably provided. Rudder 14, positioned below the stern hydrofoil 5, being in use when the craft is travelling on its hydrofoils and both rudders exerting an influence when the craft is travelling with its hull on the water. The rudders conveniently may be mounted on the strut 3.

When the craft is travelling on its hydrofoils the depth of immersion of the predictor means 9 on each predictor arm 8 varies continually as the craft travels across the waves. The various predictor means and hydrofoil actuating mechanisms hereinafter described are provided to cause the craft to lift over the waves as it meets them so that drag is not produced on the hull by contact with the water.

Figure 3 shows the construction of one form of predictor means 9a comprising a plurality of switch contacts 16 carried on pivots 16' either mounted directly onto the predictor arm 8, which is made of insulating material, such as wood, or mounted on a strip of insulating material secured to the predictor arm 8 which latter can then be made of non-insulating material, such as metal. Each contact 16 is electrically connected to a separate lead 17, which is led through the predictor arm 8 to the interior of the craft, and is associated with a fixed contact 18 secured to the predictor arm and insulated from contacts 16. All the contacts 18 are joined to a common conductor 19 passing through the predictor arm to the interior of the craft. A light spring 20 holds each switch contact 16 away from its associated fixed contact 18.

When the craft is travelling slowly with its hull on the water the contacts 16 are closed against their associated fixed contacts 18 by the water pressure overcoming springs 20, and a circuit is completed from the leads 17 to the lead 19. The completion of these circuits causes the hydrofoil actuating mechanism to operate in a manner to be described more fully hereinafter. When the craft gathers speed and rises from the water surface the uppermost contacts 16 rise above the water surface and being no longer subjected to the water pressure they are separated from their fixed contacts 18 by the springs 20. When the predictor arm 8 passes through a wave one or more of the open contacts 16 will become submerged and will be closed again to its fixed contact 18 until the wave is passed. The manner in which the reclosing of the contact pairs is caused to operate the hydrofoil actuating mechanism to make the craft rise over the wave will be fully described hereinafter. To protect the switch contacts from floating debris and from corrosion by the water a loose membrane 21 of rubber or other suitable waterproof material encloses the contacts within the recess 22 of the predictor arm 8.

Figure 4 illustrates a second form of predictor means 9b in which a series of contact pairs 23, 24 are mounted on the surface of the predictor arm 8. The contacts 23 are insulated from each other and are each electrically connected to a separate lead 17 leading to the hydrofoil actuating mechanism within the craft. All the contacts 24 are connected to a common lead 19, these contacts being insulated from the contacts 23. When the contact pairs 23, 24 are immersed in water they become short circuited and a circuit is completed from lead 19 to the leads 17. When the predictor arm 8 rises as the craft gathers speed the uppermost contact pairs break surface and become open circuited so that their leads 17 are disconnected from lead 19.

The predictor means 9b of Figure 4 is of cheaper and more robust construction than the predictor 9a of Figure 3 but it has the disadvantage that when a current passes between a contact pair the contact acting as an anode will become corroded, so that frequent replacement of one set of contacts, for example the contacts 24, will be necessary. Figure 5 illustrates a further form of predictor means 9c in which the contacts 24 of Figure 4 are replaced by a common electrode 25 clipped to the predictor arm 8 on brackets 26. In this figure, as in Figures 3 and 4, the leads 17 and 19 are connected to the hydrofoil actuating mechanism. The electrode 25 acts as a common anode to all the contacts 23 when the latter become immersed. When the electrode 25 becomes badly corroded it may be replaced quickly and at relatively little expense. Instead of being mounted on the predictor arm 8 electrode 25 may be secured to the hull of the craft at any suitable point.

The manner in which the predictor means according to Figures 3, 4 and 5 regulate one form of the hydrofoil actuating mechanism will now be described with reference to Figure 6.

Referring to Figure 6 the predictor 9c is of the type illustrated in Figure 5 comprising a series of fixed contacts 23a–23h and a common electrode 25. Electrode 25 is connected by lead 19 to the positive terminal of a direct current source 28 provided for example by a generator driven by the craft driving engine. The leads 17a-17h connect the contacts 23a-23h to one end of relay coils 29a-29h, the other end of which coils are all connected to a line 30 leading to the negative terminal of source 28. The coils 29a-29h control relays which when energised bridge contact pairs 31a-31h and when de-energised bridge contact pairs 32b-32h. Each left hand contact of contact pairs 31a-31h is connected to the lower end of the coil of a relay 33 whilst each left hand contact of contact pairs 32b-32h is connected to the lower end of the coil of a relay 34. The upper ends of the coils of relays 33, 34 are connected across a switch 35 to the positive terminal of source 28.

The right hand contacts of contact pairs 31a-31g and 32b-32h are interconnected as shown whilst the right hand contacts of contact pairs 32b to 32h are connected to a series of contacts 36b-36h mounted upon, and insulated from each other, on the hydrofoil strut 2.

The hydrofoil actuating mechanism comprises a piston 37 working within a cylinder 38. Piston 37 is connected to the hydrofoil incidence command rod 6. Valves 39, 40 controlled by relay coils 41, 42, control the supply of compressed air to the ends of cylinder 38 from a compressed air reservoir 43, whilst valves 44, 45, controlled by relay coils 46, 47 control exhaust outlets 48, 49 leading from cylinder 38. A rod 50 secured to the upper face of piston 37 is provided with a contact 51 adapted to wipe over the contacts 36b-36h as the piston 37 moves up and down in cylinder 38. Stuffing boxes diagrammatically represented at 52, 53 are provided where the incidence command rod 6 and rod 50 respectively emerge from cylinder 38. Relay coils 42 and 46 are connected in parallel with the supply 28 across the contacts 33a of relay 33 whilst relay coils 41, 47 are connected in parallel with source 28 across the contacts 34a of relay 34.

Suppose that the craft is travelling at speed on its hydrofoils and that under these conditions the four predictor contacts 23e-23h are immersed whilst contacts 23a-23d are above the water line and that the hydrofoil incidence command rod 6 is in such a position that wiping contact 51 rests on contact 36e. The four contacts 23e-23h are short circuited to the electrode 25 by immersion in the water so that coils 29e-29h carry current and contact pairs 31e-31h will be bridged.

Imagine now that the craft meets a wave and that predictor contact 23d becomes submerged. Relay coil 29d will be energised and contact pair 31d will be bridged. The bridging of contact pair 31d completes a circuit from the positive terminal of source 28 via the coil of relay 33, the right hand contact of contact pair 32e, contact 36e, and wiping contact 51 to the negative terminal of source 28. Relay 33 is therefore energised and its contacts 33a are bridged. Bridging of contacts 33a causes energisation of relay coils 42 and 46 which open valves 40 and 44. Compressed air then flows from reservoir 43 to the upper side of piston 37. The latter is forced down by the compressed air until wiping contact 51 moves off contact 36e to contact 36d when relay 33 becomes de-energised and valves 40, 44 close to arrest the movement of piston 37. The downward movement of piston 37 moves the incidence command rod 6 in a downward direction causing the hydrofoil 4 (see Figures 1 and 2) to pivot on strut 2 and to assume a greater angle of attack. This increased angle of attack causes the craft to rise over the wave predicted by predictor 9c. The craft continues to rise until predictor contact 23d breaks surface to de-energise coil 29d and cause contacts 32d to be bridged. Bridging of contacts 32d completes a circuit from source 28 to the coil of relay 34 via contact 36d and wiping contact 51. Energisation of relay 34 energises relay coils 41, 47 to open valves 39, 45. Compressed air from cylinder 43 now forces piston 37 upwards in cylinder 38 and the angle of attack of hydrofoil 4 is restored to the value existing before the wave was encountered. Wiping contact 51 returning in the process to contact 36e whereupon valves 39, 45 close and piston 37 comes to rest. Wiping contact 51 is of sufficient size to bridge two of the contacts 36 so that it cannot come to rest in between two contacts.

The hydrofoil actuating mechanism can be operated without use being made of the predictor 9c by opening switch 35. The angle of attack of the hydrofoils may then be adjusted by the press-buttons 54, 55. Depression of press-button 54 bridges contacts 33b to energise relay coils 42, 46. Energisation of these coils opens valves 40, 44 to cause the hydrofoil incidence command rod 6 to be moved downwards to increase the angle of attack of hydrofoil 4. In like manner closing of press button 55 decreases the angle of attack of hydrofoil 4.

Although predictor 9c is shown constructed in accordance with the predictor described with reference to Figure 5, exactly the same effect will be obtained if a predictor 9a or 9b according to Figure 3 or 4 is employed.

It is stated above that the working fluid of the actuating mechanism is compressed air. The actuating mechanism will of course work equally well with the water or oil as the working fluid, the reservoir 43 then forming an hydraulic accumulator. Whatever the working fluid the reservoir or accumulator 43 is supplied by a suitable compressor or pump (not shown) through a nonreturn valve 56.

Figure 7 illustrates the connection of a further form of hydrofoil actuating mechanism with the predictor 9c. Predictor 9c, with its associated relay coils 29a-29h, contacts 31a-31h, contacts 32b-32h, contacts 36b-36h and wiping contact 51, is connected in circuit with the coils of relays 33, 34 to the source 28 in the same manner as in the circuit described with reference to Figure 6, with the exceptions that switch 35 of Figure 6 is replaced by a switch 57 in lead 19 and each of the coils 29a-29h is provided with its own isolating switch 58a-58h. The purpose of these switches will be fully described hereinafter.

The incidence command rod 6 is driven vertically upwards or downwards by a reversible electric motor 59 through suitable gearing (such as a worm on the motor shaft engaging a rack on the command rod 6). Motor 59 has a field winding 60 directly connected to the source 28 whilst the armature may be connected to source 28 by closing either contacts 33c and 33d of relay 33, or contacts 34c and 34d of relay 34. When the contacts of relay 33 are closed the motor 59 rotates in one direction whilst when the contacts of relay 34 are closed it rotates in the other direction.

Suppose that the craft is travelling at speed on its hydrofoils with predictor contacts 23e-23h submerged and wiping contact 51 on contact 36e, The relay contacts 31a–31h and 32b–32h will be either open circuited or bridged as shown, and as fully described with reference to Figure 6.

If now the craft meets a wave and contact 23d becomes submerged, coil 29d will be energised and contact pair 31d will be bridged. The coil of relay 33 becomes energised and contacts 33c and 33d are closed. Current can now pass to the armature of motor 59 which latter commences to rotate in a direction to drive the command rod 6 downwards to increase the angle of attack of hydrofoils 4 (see Figures 1 and 2). The wiping contact 51 upon reaching contact 36d cuts off the supply to the coil of relay 33, the contacts 33c and 33d of which open, and the motor 59 comes to rest. With the increased angle of attack of the hydrofoil the craft rises over the wave encountered by predictor 9c. As predictor 9c passes the wave contact 23d will break surface and coil 29d will be de-energised. Contact pair 32d is bridged and a circuit is completed across this contact pair and wiping contact 51 (which is now on contact 36d) to the coil of relay 34. Energisation of the coil of relay 34 closes contacts 34c and 34d to drive motor 59 in a direction to drive the command rod 6 upwards. The angle of attack of hydrofoil 4 is reduced to the value existing before the wave was encountered and wiping contact 51 returns to contact 36e in which position neither relay 33 nor relay 34 is energised and motor 59 comes to rest.

Although a predictor 9c is shown, constructed in accordance with that described with reference to Figure 5, it will be appreciated that the above described circuit would operate in exactly the same manner with predictors 9a or 9b of the types described with reference to Figure 3 or Figure 4.

The entire control system can be rendered inoperative by opening switch 61 which open circuits simultaneously the armature and field circuits of motor 59, whilst if it is desired to cut out the automatic predictor 9c switch 57 is thrown over to its contact 62. The angle of incidence of the hydrofoil 4 may then be controlled by manual operation of the switches 58a–58h, which switches are open during automatic prediction.

Figure 8 indicates an alternative method of actuating the hydrofoil command rod 6 from the reversible motor 59 of Figure 7. Referring to Figure 8 a worm 63 mounted on the shaft of motor 59 engages a wormwheel 64, rotation of which causes a threaded rod 65 to move through a central threaded hole in the wormwheel. Movement of wormwheel 64 along the axis of rod 65 is prevented by the pedestals 66, 67 which also act as bearings for rod 65. A slide valve 68 attached to the upper end of rod 65 controls the supply of compressed air from a reservoir 69 to a cylinder 70. A piston 71 in cylinder 70 is connected to the incidence command rod 6 which is in turn connected to the hydrofoil 4 pivotally mounted on strut 2.

Rotation of motor 59 in one direction causes slide valve 68 to move into a position where compressed air can flow from the supply pipe 72 into the upper end of cylinder 70 through channel 73. Piston 71 will be forced downwards to increase the angle of attack of hydrofoil 4, the lower end of cylinder 70 being connected to the exhaust pipe 75 through channel 74 and the slide valve chamber 76. A pump 77 draws exhaust air from chamber 76 and pumps it past the non-return valve 78 back into reservoir 69. An air inlet 79 having a non-return valve 80 is also provided to compensate for any air leakage in the system. Rotation of motor 59 in the opposite direction moves slide valve 68 into a position where compressed air from reservoir 69 is supplied to the lower end of cylinder 70 to drive piston 71 upwards and reduce the angle of attack of hydrofoil 4.

If the predictor 9c (of Figure 7) transmits a signal of considerable duration it is possible that the motor 59 will be driven in one direction for a sufficient length of time for slide valve 68 to be moved to one end or the other of valve chamber 76. To avoid this eventuality switches 81, 82 (see Figures 7 and 8) in the circuits of the coils of relays 33 and 34 are adapted to be opened by a projection 83 mounted on rod 65. Switch 81 will be opened just before slide valve 68 reaches its upper permissible limit of travel to de-energise the coil of relay 33 and stop motor 59. In like manner opening of switch 82 when slide valve 68 is approaching its lower permissible limit of travel will de-energise the coil of relay 34. Although it is stated above that the working fluid of cylinder 70 is compressed air it will be appreciated that the system will operate equally well with a liquid as the working fluid, in which case reservoir 69 will be replaced by a hydraulic accumulator and inlet 79 will lead to a liquid reservoir.

Figure 9 illustrates a further hydrofoil actuating mechanism according to the invention in which movement of the hydrofoil incidence command rod is effected by means of a kinetic energy actuator generally designated 84.

The kinetic energy actuator 84 comprises two flywheels 85, 86 rotatably mounted side by side on the command rod 6, which are driven rapidly in opposite directions by an electric motor 87 through spur wheels 88, 89, 90, 91, 92. Spur wheels 88 and 90 are keyed to a shaft 93 joined to motor 87 by a coupling 94 and carried in bearings 95, 96 in the actuator housing 97. Spur wheels 89 and 92 are keyed to flywheels 86 and 85 respectively. The idler wheel 91 is mounted on a shaft 98 secured to the housing 97.

The flywheels 85, 86 are provided with excitation windings diagrammatically indicated by reference numerals 99, 100 the ends of which are connected to slip rings 101, 102.

Interposed between flywheels 85, 86 is a rotor 103 having a short circuited winding diagrammatically indicated by reference numeral 104. Rotor 103 has a centrally disposed threaded hole which engages a threaded portion 105 on command rod 6. Rotation of rotor 103 in one direction causes command rod 6 to be lowered whilst rotation in the other direction causes command rod 6 to rise. Bearings 106 and 107 support command rod 6 in the housing 97.

The leads A, B, C, D are connected to brushes which bear on the slip rings 101, 102.

The above described hydrofoil actuating mechanism may be employed with the predictor means 9c and associated relay contacts 31a–31h, 32b–32h and contacts 36b–36h of Figure 6, the leads A, B, C, D of Figure 9 being connected to the apparatus enclosed within the chain line 108 of Figure 6 by connection respectively to the leads A, B, C, D of Figure 6. The rod 50 of Figure 6 will be secured to the upper end of the command rod 6 as shown in Figure 9.

Suppose that the craft is travelling on its hydrofoils under the same conditions that initially were assumed in the case of the control system according to Figure 6, i. e. predictor contacts 23e to 23h immersed, and wiping contact 51 on contact 36e.

If the predictor contact 23d now meets a wave and becomes submerged the coil of relay 33 will be energised as fully described with reference to Figure 6, leads A, B will be connected to the supply source 28 by closing of contacts 33a and the excitation winding 99 of flywheel 85 becomes energised.

The rotating energised winding 99 then causes the rotor 103 to rotate by interaction with the rotor winding 104 of the latter. Rotation of the rotor 103 causes the incidence command rod 6 to be depressed to increase the angle of attack of the hydrofoil 4 and the craft is caused to rise relative to the water surface. Depression of the command rod 6 causes wiping contact 51 to move on to contact 36d (Figure 6), relay 33 becomes de-energised, the supply to excitation winding 99 is cut off and rotor 103 comes to rest.

The increased angle of attack of hydrofoil 4 causes the craft to rise over the wave predicted by predictor 9c until predictor contact 23d breaks surface. When predictor contact 23d breaks surface relay coil 29d is de-energised and contacts 32d are bridged. Relay 34 now becomes energised and contacts 34a are closed to connect the flywheel excitation winding 100 in circuit with the source 28 over leads C, D and relay contacts 34a. Interaction between the rotating energised winding 100 and the winding 104 of rotor 103 causes the latter to be driven in the opposite direction so causing the incidence command rod to be raised to decrease the angle of attack of the hydrofoil 4 to the value existing before the wave was encountered, wiping contact 51 returning in the process to contact 36e whereupon relay 34 is de-energised and rotor 103 comes to rest.

In order to prevent hunting of the device a brake 109 may be provided to prevent continued rotation of the rotor 103 when the excitation windings 99 and 100 are de-energised.

Brake 109 is normally urged by a spring 110 against the periphery of rotor 103 to prevent rotation of the latter. Release of brake 109 is governed by a relay coil 111 which when energised overcomes the tension of spring 110. Relay coil 111 is connected to supply source 28 across the contacts 112b of a relay having coils 112a and 112c respectively in the leads, A, C. When either lead A or lead C carries current contacts 112b are bridged, brake 109 is released by energisation of coil 111 and rotor 103 is free to rotate. When neither of the leads A or C is carrying current contacts 112b are open circuited. Coil 111 will not be energised under these conditions and spring 110 applies the brake 109 to rotor 103.

By opening switch 35 of Figure 6 the predictor 9c may be isolated and the craft can then be controlled by manual operation of the press buttons 54, 55.

The arrangement of Figure 9 may be modified by providing the rotor 103 with a phase wound winding. Referring to Figure 10 the rotor 113 is provided with a 3-phase winding 114, the separate phases being connected to slip rings 115 mounted on the rotor. It then becomes possible to insert an external resistance 116 in the rotor circuit 114 to increase the slip between the rotor 113 and the rotating fields 99 and 100. The value of the external rotor resistance 116 is varied manually from within the craft by adjustment of the contacts 117.

Figure 11 shows a modification of the arrangement of Figures 9 and 10. As in the arrangement according to Figure 10 the rotor 113 has a phase wound winding 114 the resistance of which can be increased by an external resistance 116. The predictor 9c is provided with two auxiliary contact pairs 118 and 119 which may be constructed in the same manner as the predictor contacts described with reference to Figure 3. These auxiliary contact pairs are placed at a considerable distance from the normal water line so that contact pair 118 becomes immersed, and contact pair 119 breaks surface, only when the craft is travelling on its hydrofoils in a rough sea. Contact pair 118 is in circuit with a relay coil 120a and the electric supply 28 whilst contact pair 119 is in circuit with a relay coil 120b and supply source 28. When energised, relay coil 120a open circuits relay contacts 120c and 120d and closes relay contact 120e, whilst relay coil 120b, when energised, tends to close contacts 120c and 120d and open contact 120e. A spring 121 urges the relay in a direction to open circuit contacts 120c and 120d and close contact 120e.

When the craft is travelling with the predictor 9c submerged to the water line n—n contact pair 119 is closed by the water pressure and contact pair 118 is open circuited. Under these conditions relay coil 120a is de-energised and relay coil 120b is energised. Relay coil 120b overcomes the thrust of spring 121 and closes contacts 120c and 120d and opens contact 120e. The rotor winding 114 will then be connected in circuit with the external rotor resistance 116. The slip of rotor 113 will be fairly large, owing to the high resistance of its winding, and any corrections of the angle of attack of hydrofoil 4 due to slight changes of water level at predictor 9c will take place relatively slowly. If now the water level changes suddenly by a considerable amount to the water line p—p contact pair 118 is immersed and closed by the water pressure. Relay coil 120a is energised, which, together with the thrust of spring 121, overcomes the pull of relay coil 120b to open contacts 120c and 120d and close contact 120e. The external resistance 116 is disconnected from rotor winding 114 and the closing of contact 120e short circuits the slip rings 115 with the result that the slip of the rotor 113 is reduced. The correction of the angle of attack of hydrofoil 4 will therefore take place relatively quickly.

In like manner if the water level suddenly drops a considerable amount to level r—r both contact pairs 118 and 119 are open circuited and spring 121 urges the relay in a direction to open contacts 120c and 120d and close contact 120e. The rotor winding resistance and hence the rotor slip is again decreased and correction of the angle of attack of hydrofoil 4 takes place rapidly.

Although predictor 9c in Figures 9 to 11 is shown as being of the type described with reference to Figure 5 it will be appreciated that operation of the control system will be exactly the same with predictors 9a or 9b constructed according to Figure 3 or 4.

Instead of the slip couplings described with reference to Figures 9 to 11 the flywheels 85, 86 and rotor 103 may form the elements of an electromagnetic clutch.

When an electric slip coupling, or a magnetically operated clutch is used, for a very high speed, it may be advantageous to have fixed excitation windings, separate from the flywheels 85, 86, so avoiding the use of slip rings 101, 102 and brush gear required in the case of windings secured to the flywheels.

Figure 12 illustrates a control system for hydrofoil craft comprising a predictor 9a of the type described with reference to Figure 3 and having a kinetic energy actuator for varying the angle of attack of hydrofoil 4 which comprises a hydraulic coupling generally designated 122.

The hydraulic coupling 122 operates on the principle of the well known Föttinger hydraulic transformer. The two flywheel members 123, 124 are driven rapidly in opposite directions on an extension 125 of the command rod 6 by an electric motor and gearing (not shown) in the same way as the flywheels 85, 86 of Figure 9. A plurality of cup like depressions 126, lying on a circle concentric with the axis of extension 125, is formed in the inwardly facing surface of each flywheel member. Interposed between the flywheel members 123, 124 is a rotor 127 keyed to the extension 125. The opposite faces of rotor 127 are provided with a plurality of cup like depressions 128a and 128b equal in number to, and lying on a circle of the same diameter as, the depressions 126 of the flywheel members 123, 124.

Extension 125 is a hollow shaft having a closure member 129 in its bore which divides it into two tubular portions 130, 131. Channels 132 and 133 connect the bores of tubular portions 130 and 131 respectively to the cup like depressions 128a and 128b. Tubular portion 130 of extension 125 is connected by a liquid tight coupling 134, within which it is free to rotate, to a supply line 135. Tubular portion 131 is connected by a liquid tight coupling 136, within which it is free to rotate, to a liquid supply line 137. Supply lines 135 and 137 are connected to the outlet pipe 138 of an hydraulic accumulator, generally designated 139, through the hydraulic valves 140 and 141 respectively. Hydraulic accumulator 139 comprises a cylinder 142 into the lower end of which lead the outlet pipe 138 and an inlet pipe 143. Within cylinder 142 is a ram 144 loaded by a weight 145 carried by a cradle 146. A pump 147, driven by the engine of the craft, supplies liquid to the hydraulic accumulator through a non-return valve 148 in the inlet pipe 143. The supply to the pump is drawn from the casing 149 of the hydraulic coupling 122 through pipe 150 and from a liquid reservoir (not shown) through a pipe 151 and non-return valve 152.

The hydraulic valves 140, 141 are controlled respectively by relay coils 153 and 154, which are supplied by leads A, B and C, D respectively.

The above described hydraulic actuating mechanism may be employed with the predictor means 9c and associated relay contacts 31a–31h, 32b–32h and contacts 36b–36h of Figure 6, the leads A, B, C, D, of Figure 12 being connected to the apparatus enclosed within the chain line 108 of Figure 6 by connection respectively to the leads A, B, C, D of Figure 6. The rod 50 of Figure 6 will be secured directly to the hydrofoil command rod 6 as shown in Figure 12.

Suppose that the craft is travelling on its hydrofoils under the same conditions that initially were assumed in the case of the control system according to Figure 6, i. e. predictor contacts 23e–23h immersed and wiping contact 51 on contact 36e.

If the predictor contact 23d now meets a wave and becomes submerged the coil of relay 33 will be energised, as fully described with reference to Figure 6, leads A, B will be connected to the supply source 28 by closing of contacts 33a, and hydraulic valve 140 will be opened by energisation of relay coil 153.

Liquid from the hydraulic accumulator 139 can now pass to the cup like depressions 128a of rotor 127 and depressions 126 in flywheel member 123 through pipe 135, tubular portion 130 and channels 132, with the result that the rotor 127 is dragged around with flywheel member 123 and rotates extension 125. This latter is provided at its lower end with a threaded rod 155 which engages a threaded hole 156 in the upper end of the command rod 6. Rotation of rotor 127 and extension 125 with flywheel member 123 causes rod 155 to depress the command rod 6 and to increase the angle of attack of hydrofoil 4, wiping contact 51 moving to contact 36d in the process. Movement of wiping contact 51 to contact 36d de-energises the coil of relay 33 causing contacts 33a to open and relay coil 133 to be de-energised. Hydraulic valve 140 closes, the supply of liquid from hydraulic accumulator 139 to the rotor 127 and flywheel member 123 ceases and rotor 127 comes to rest.

The increased angle of attack given to hydrofoil 4 causes the craft to rise over the wave predicted by predictor 9c until predictor contact 23d breaks surface. When predictor contact 23d breaks surface relay coil 29d is de-energised and contacts 32d are bridged. Relay 34 now becomes energised and contacts 34a are closed to energise relay coil 154 over leads C, D. Energisation of relay coil 154 opens hydraulic valve 141 to supply fluid from the hydraulic accumulator to the cup like depressions 128b of rotor 127 and depressions 126 in flywheel member 124 through pipe 137, tubular portion 131 and channels 133. Rotor 127 then rotates in the opposite direction with flywheel member 124. Extension 125 and threaded rod 155 now rotate in a direction causing the command rod 6 to rise to reduce the angle of attack of hydrofoil 4 to the value existing before the wave was encountered, wiping contact 51 returning in the process to contact 36e whereupon relay 34 is de-energised and rotor 127 comes to rest.

By opening switch 35 of Figure 6 the predictor 9c may be isolated and the craft then may be controlled by manual operation of press buttons 54, 55 or by manual control of valves 140, 141.

Although predictor 9c is shown constructed in accordance with the predictor of Figure 5 it will be appreciated that predictors 9a or 9b according to Figures 3 and 4 could be employed equally well with the above described control system.

Figure 13 illustrates a further control system for hydrofoil craft comprising a predictor 9c of the type described with reference to Figure 5 and a kinetic energy actuator for varying the angle of attack of hydrofoil 4 comprising a pneumatically operated clutch, generally designated 157. The relay coils 153, 154 of Figure 13 are controlled by predictor 9c and its associated apparatus enclosed within chain line 108 of Figure 6 in exactly the same way as the relay coils 153, 154 of Figure 12. Relay coil 153, when energised opens a pneumatic valve 158 to an exhaust pipe 159. When de-energised relay coil 153 opens valve 158 to a compressed air supply line 160. Relay 154 when energised opens a valve 161 to the supply pipe 160 and when de-energised opens the valve 161 to exhaust 159. Valves 158 and 161 are connected by pipes 162, 163 to pneumatic cylinders 164, 165 respectively. Within these cylinders are pistons 166, 167 the piston rods of which are pivotally connected to arms 168, 169 mounted on pivots 172, 171. The left hand ends of arms 168, 169 have forked portions 172, 173 engaging between flanges 174, 175 secured to flywheels 176, 177. Flywheels 176, 177 are driven rapidly in opposite directions by an electric motor and suitable gearing (not shown) in the same way as the flywheels 85, 86 of Figure 9. Interposed between the flywheels 176, 177 is a clutch plate 178 secured to shaft 179 upon which the flywheels 176, 177 are slidably and rotatably mounted.

When neither of the relay coils 153, 154 is energised cylinder 164 is connected through the valve 158 to supply line 160 (leading to a compressed air reservoir not shown) and cylinder 165 is connected through valve 161 to exhaust 159. The compressed air acting on piston 166 depressed the latter to raise flywheel 176 away from clutch plate 178. Flywheel 177, under the influence of its weight is lowered out of contact with clutch plate 178.

If now relay coil 153 becomes energised in the manner described with reference to Figure 12 valve 158 connects cylinder 164 to exhaust 159 and flywheel 176 descends under its own weight on to clutch plate 178 and causes the latter to rotate. If necessary the flywheel may be spring urged downwards to obtain a more effective drive between the flywheel and clutch plate 178. Rotation of clutch plate 178 causes rotation of shaft 179 which shaft is connected to the incidence command rod of the craft (not shown) in the same manner as the extension piece 125 of Figure 12. The incidence command rod will therefore be depressed to increase the angle of incidence of the hydrofoil to cause the craft to rise relative to the water surface. In a similar manner when relay coil 154 is energised flywheel 177 is lifted into contact with clutch plate 178 to rotate shaft 179 in the opposite direction to raise the incidence command rod.

The switch 35 of Figure 6 may be opened to isolate the predictor 9c so that the craft can be controlled by manual operation of valves 158, 161, or by operation of the press buttons 54, 55 of Figure 6.

The predictor 9c may of course be replaced by a predictor 9a or 9b of the type described with reference to either Figure 3 or Figure 4.

The above described arrangement may be modified to one comprising an hydraulically operated clutch in which case supply pipe 160 is connected to an hydraulic accumulator of the type described with reference to Figure 12.

Figures 14 and 15 show a further form of predictor means 9d according to the invention. Secured to the predictor arm 8 are two metal electrodes 180, 181 retained in sockets 182, 183 by set screws 184, 185. Leads 17 and 19 connect the two electrodes to a hydrofoil actuating mechanism situated within the craft, the construction of which will be fully described hereinafter.

If a voltage is applied across leads 17 and 19 a current will flow between the electrodes when they are immersed in water, the magnitude of which current will depend upon the depth of immersion of the electrodes.

Figure 16 shows how the predictor means 9d according to Figures 14 and 15 may be connected to a hydrofoil actuating mechanism of the types described with reference to Figures 6 and 7. Electrode 180 is connected to the positive terminal of supply source 28 whilst electrode 181 is connected to a plurality of series connected graded relay coils 186a–186h. Relay coils 186a–186h are dimensioned to respond to currents of different magnitude to control contacts 31a–31h and 32b–32h. Thus relay coil 186h first becomes energised when a small current passes between electrodes 180, 181. If electrodes 180, 181 are slowly immersed to a greater and greater depth the current flowing between them will gradually increase and relay coils 186g–186a will in turn become energised until when electrodes 180, 181 are immersed to their maximum depth all the relay coils will be energised. In Figure 16 the electrodes 180, 181 are immersed to such a depth that a current of sufficient magnitude passes between them to energise relay coils 186e–186h to close contacts 31e–31h. Relay coils 186a–186d are not energised and contacts 32b–32d will be bridged.

The circuit of Figure 16 operates in exactly the same way as those of Figures 6 and 7 to operate either the pneumatic, hydraulic or electric hydrofoil actuating mechanisms described with reference to those figures, or the kinetic energy actuators described with reference to Figures 9 to 13.

To compensate for variations in conductivity of the water in which the craft is travelling (for example the conductivity of sea water is greater than that of river water) and for variations in water temperature the voltage applied to the electrodes of predictor 9d may be varied by means of a potentiometer 187. An ammeter 188 placed in the circuit of electrodes 180, 181 measures the current flowing between the electrodes and can be calibrated to indicate the angle of attack of the hydrofoils. By suitable adjustment of potentiometer 187 the pilot of the craft can maintain the hydrofoils 4 at their maximum angle of attack during take-off of the craft so that the craft rides on to its hydrofoils in the shortest possible time.

In yet a further embodiment of the invention the predictor comprises a copper mica condenser secured to the end of the predictor arm 8 (Figures 1 and 2). The copper mica condenser being sensitive to water pressure, the intensity of an alternating current applied to it can be made to vary according to either the speed of the craft or to its depth of immersion. If it is desired that the condenser shall only respond to depth of immersion it will be necessary to shield it from the pressure variations which are a function of the speed of the boat. Such a copper mica condenser may replace electrodes 180, 181 in the control systems according to Figure 16, supply source 28 being a source of alternating current.

The force required to alter the angle of attack of the hydrofoils will increase as the speed of the craft increases. In the case of a hydrofoil actuating mechanism according to Figure 7, the increased force necessary to operate the hydrofoils at high craft speeds will be provided automatically by the reversible motor 59 consuming an increased current from source 28. In the case of hydrofoil actuating mechanisms according to Figures 6, 8, 9, 10, 11, 12, 13, and 16, the tendency will be for the actuation of the hydrofoils to take place more slowly as the speed of the craft increases. To counteract this tendency the predictor arm 8 (see Figures 1 and 2) may be adapted to project further from the craft at high speeds so that prediction of the wave surface ahead of the craft occurs earlier. This movement forward of predictor arm 8 preferably is effected automatically. For example a small object may be towed by a wire behind the craft. As the craft speed increases the strain on the wire increases and this variable strain can be made to open and close electric contacts within the craft controlling a small electric motor driving the predictor arms 8 backwards and forward through the agency of a rack and pinion mechanism. As an alternative to moving the predictor arms 8 the above mentioned wire may be adapted to control a further potentiometer connected across supply source 28 in the case of the control systems according to Figure 16, to increase the voltage applied to the predictor automatically as the speed of the craft increases.

All of the predictor mechanisms described above may be mounted on streamlined struts projecting forwardly of the craft and they will travel smoothly through the water without any of the bumping or bouncing experienced with mechanical skids and they will not materially affect directional stability of the craft.

Due to this simple construction the predictor arms 8 may be retracted easily into the craft, or be swung upwards from the water, when the craft comes alongside. It thus becomes possible to provide hydrofoil craft according to the present invention with landing wheels which are lowered, prior to beaching, below hydrofoils 4. In hitherto known hydrofoil craft this has not been possible owing to the vulnerability of the comparatively fragile and non-retractable mechanical prediction gear.

It is to be understood that the invention is not limited to the particular method of adjusting the angle of attack of the hydrofoils by means of a command rod as described above. As an alternative to the incidence command rod 6, two wires or rods may be connected to the hydrofoil equidistant from its pivotal point on strut 2 one to the fore and one to the aft of said point. These wires or rods are carried up to a chain passing over a sprocket which is geared to any of the above described hydrofoil actuating mechanisms in any suitable manner.

Furthermore the invention is not limited to craft comprising only one hydrofoil 4 mounted to the struts 2. The hydrofoil actuating mechanisms described above may be linked to a plurality of hydrofoils arranged one above the other on each strut 2.

What I claim is:

1. Apparatus for a boat having a hydrofoil, comprising predictor means rigidly mounted with relation to the boat adapted to travel at least partially submerged under the water ahead of the boat, and including electrical means for producing a signal upon a change in level of the water surface relative to said predictor means, in combination with an actuating mechanism connected to the hydrofoil and adapted to receive the signal from said predictor means and varying the angle of attach of said hydrofoil, whereby the boat is caused to follow the undulations of the water surface.

2. Apparatus as claimed in claim 1 and including in the predictor means a predictor arm rigidly mounted with relation to the boat adapted to project forwardly from the boat and to plunge into the water ahead of the boat; the predictor means being mounted on said arm.

3. Apparatus as claimed in claim 1 wherein the hydrofoil actuating mechanism comprises a cylinder, a piston adapted to be moved in either direction in said cylinder by fluid pressure, and incidence command means for joining said piston to the hydrofoil whereby movement of said piston may vary the angle of attack of the hydrofoil.

4. Apparatus as claimed in claim 3 wherein the hydrofoil actuating mechanism comprises electric relays in combination with valves controlled by said relays and adapted to regulate the supply of fluid to the cylinder.

5. Apparatus as claimed in claim 4 and including an electric supply source and a second group of relays, the first-mentioned relays controlling the valves being electrically connected to said electrical supply source through said second group of relays and said second group of relays being electrically connected to the predictor means whereby the electric relays controlling the valves may be energized from said electric supply source through said second group of relays and the energization of said second group of relays can be controlled by the predictor means.

6. Apparatus as claimed in claim 1 wherein the hydrofoil actuating mechanism comprises a cylinder, a piston adapted to be moved in either direction within said cylinder by fluid pressure, a slide valve adapted to control a supply of fluid to said cylinder, a reversible electric motor for controlling the position of said slide valve, and means for connecting said piston to the hydrofoil whereby movement of the piston can vary the angle of attack of the hydrofoil.

7. Apparatus as claimed in claim 6 and including an electrical supply source, a pair of relays having contacts, the armature of the reversible motor being connected to said supply source across the contacts of said relays and means electrically connecting said relays with said predictor means whereby the opening and closing of said contacts may be controlled by said predictor means.

8. Apparatus as claimed in claim 7 wherein the closing of the contacts of one of the relays in adapted to cause the reversible motor to rotate in one direction whilst the closing of the contacts of the other relay is adapted to cause the reversible motor to rotate in the other direction.

9. Apparatus as claimed in claim 1 wherein the hydrofoil actuating mechanism comprises a cylinder, a piston adapted to be moved in either direction within said cylinder by fluid pressure, a slide valve adapted to regulate the supply of fluid to said cylinder, a reversible electric motor for controlling the position of said slide valve, and means for connecting the piston with the hydrofoil whereby the angle of attack of the hydrofoil may be varied, in combination with means for rendering the hydrofoil actuating mechanism inoperative when the hydrofoil attains a predetermined angle of attack.

10. Apparatus as claimed in claim 1 wherein said hydrofoil actuating mechanism comprises an electric slip coupling, said coupling including two fly wheels adapted to be rotated in opposite directions and having excitation windings, a driven rotor interposed between said flywheels and means for connecting said rotor to the hydrofoil, whereby when said rotor is driven by one of said fly wheels the angle of attack of said hydrofoil can be varied.

11. Apparatus as claimed in claim 10 wherein the rotor is provided with a short-circuited winding.

12. Apparatus as claimed in claim 1 wherein the hydrofoil actuating mechanism comprises an electric slip coupling, said coupling including two flywheels, said flywheels each being provided with an excitation winding and the two wheels being adapted to rotate in opposite directions, a driven rotor having a phase wound winding, said rotor being interposed between said flywheels and means for connecting said rotor to the hydrofoil, whereby when said rotor is driven by one of said flywheels the angle of attack of said hydrofoil may be varied.

13. Apparatus as claimed in claim 12 and including an external resistance and slip rings, said slip rings connecting said external resistance to the rotor winding.

14. Apparatus as claimed in claim 13 and comprising control means connecting the predictor means to the circuit between the external resistance and the rotor.

15. Apparatus as claimed in claim 14 and including means for varying the magnitude of the external resistance.

16. Apparatus as claimed in claim 1 wherein the hydrofoil actuating mechanism comprises an electric slip coupling including two flywheels having excitation windings and adapted to rotate in opposite directions, the windings of said fly wheels being adapted to form the rotating field of said coupling, a rotor interposed between said flywheels, said rotor having an axially threaded aperture; in combination with a threaded rod engaging in said rotor aperture and adapted to connect with said hydrofoil whereby when said rotor is driven by one of said fly wheels said rod is caused to move axially of said rotor and thus vary the angle of attack of said hydrofoil.

17. Apparatus as claimed in claim 16 wherein said flywheels are loosely mounted for rotation on said rod.

18. Apparatus as claimed in claim 1 wherein the hydrofoil actuating mechanism comprises an hydraulic slip coupling, said coupling including two flywheels adapted to be rotated in opposite directions as driving members, a driven rotor interposed between said flywheels and means for connecting said rotor to the hydrofoil whereby when said rotor is driven by one of said flywheels the angle of attack of said hydrofoil may be varied.

19. Apparatus as claimed in claim 18 and including an hydraulic accumulator, a valve and means connecting said hydraulic accumulator to the hydraulic slip coupling through said valve whereby liquid may be supplied to said coupling from said accumulator.

20. Apparatus as claimed in claim 19 comprising means for operating the valves connected to the predictor means whereby the opening and closing of the valves can be controlled by the predictor means.

21. Apparatus as claimed in claim 1 wherein said hydrofoil actuating mechanism comprises an hydraulic slip coupling having two flywheels adapted to rotate in opposite directions as the driving members of said coupling and a rotor interposed between said flywheels and adapted to be driven by a flywheel as the driven member of said coupling, in combination with a shaft, a threaded rod extending from said shaft, and an incidence command rod having a threaded aperture and adapted to be connected to said hydrofoil, said rotor being mounted on said shaft, said threaded rod being engaged in the aperture of said command rod and said flywheels being loosely mounted for rotation on said shaft whereby rotation of said rotor and shaft causes said threaded rod to move said incidence command rod and thereby vary the angle of attack of the hydrofoil.

22. Apparatus as claimed in claim 1 wherein said hydrofoil actuating mechanism comprises a fluid actuated friction clutch having two driving members adapted to rotate in opposite directions, a clutch plate interposed between said driving members and adapted to be driven by one of said driving members, and means for connecting said clutch plate to said hydrofoil whereby movement of said clutch plate varies the angle of attack of said hydrofoil.

23. Apparatus as claimed in claim 22 and including two fluid actuated pistons each of which is connected to one of the driving members whereby movement of one of said pistons is adapted to move one of the driving members into engagement with the clutch plate.

24. Apparatus as claimed in claim 23 and including fluid supply means, valves, means connecting said fluid supply means through said valves to the pistons and electric relays connecting said valves to the predictor means.

25. Apparatus as claimed in claim 1 wherein the hydrofoil actuating mechanism comprises a compressed air actuated friction clutch having two driving members adapted to rotate in opposite directions, a clutch plate interposed between said driving members and adapted to be driven by one of said driving members, and means for connecting said clutch plate to the hydrofoil, whereby movement of said clutch plate varies the angle of attack of the hydrofoil.

26. Apparatus as claimed in claim 1 wherein said hydrofoil actuating mechanism comprises a fluid actuated friction clutch having two driving members adapted to rotate in opposite directions, a clutch plate interposed between said driving members and adapted to be driven by one of said driving members and means for connecting said clutch plate to the hydrofoil in combination with an hydraulic accumulator adapted to supply liquid under pressure to actuate said clutch.

27. Apparatus as claimed in claim 10 in combination with braking means acting on said driven rotor.

28. Apparatus as claimed in claim 27 and comprising an electric relay connected to the predictor means and the brake whereby the release of the brake is controlled by the predictor means.

29. Apparatus as claimed in claim 1 and including a predictor arm adapted to project forwardly from the boat and to plunge into the water ahead of the boat; wherein the predictor means comprises a plurality of fixed contacts mounted one above another on said predictor arm, a movable contact associated with and insulated from each of said fixed contacts and a light spring adapted to hold away each of said movable contacts from its associated fixed contact, said movable contacts being exposed to the effect of the movement of the boat through the water whereby the dynamic pressure caused by such movement may overcome the thrust of said spring to allow a movable contact to move against a fixed contact whereby a signal may be transmitted to the actuating mechanism; and wherein the actuating mechanism comprises a cylinder, a piston adapted to be moved in either direction in said cylinder by fluid pressure, and incidence command means for joining said piston to the hydrofoil whereby movement of the piston may vary the angle of attack of the hydrofoil.

30. Apparatus as claimed in claim 1 and including a predictor arm adapted to project forwardly from the boat and to plunge into the water ahead of the boat; wherein the predictor means comprises a plurality of fixed contacts mounted one above another on said predictor arm, a movable contact associated with and insulated from each of said fixed contacts and a light spring adapted to hold away each of said movable contacts from its associated fixed contact, said movable contacts being exposed to the effect of the movement of the boat through the water whereby the dynamic pressure caused by such movement may overcome the thrust of said spring to allow a movable contact to move against a fixed contact whereby a signal may be transmitted to the actuating mechanism; and wherein the actuating mechanism comprises an electric slip coupling, said coupling including two flywheels adapted to be rotated in opposite directions and having excitation windings, a driven rotor interposed between said flywheels and means for connecting said rotor to the hydrofoil, whereby when said rotor is driven by one of said flywheels the angle of attack of said hydrofoil may be varied.

31. Apparatus as claimed in claim 1 and including a predictor arm adapted to project forwardly from the boat and to plunge into the water ahead of the boat, wherein the predictor means comprises a plurality of fixed contacts mounted one above another on said predictor arm, a movable contact associated with and insulated from each of said fixed contacts and a light spring adapted to hold away each of said movable contacts from its associated fixed contact, said movable contacts being exposed to the effect of the movement of the boat through the water whereby the dynamic pressure caused by such movement may overcome the thrust of said spring to allow a movable contact to move against a fixed contact, whereby a signal may be transmitted to the actuating mechanism; and wherein the actuating mechanism comprises an hydraulic slip coupling, said coupling including two flywheels adapted to be rotated in opposite directions as driving members, a driven rotor interposed between said flywheels and means for connecting said rotor to the hydrofoil whereby when said rotor is driven by one of said flywheels the angle of attack by said hydrofoil may be varied.

32. Apparatus as claimed in claim 1 and including a predictor arm adapted to project forwardly from the boat and to plunge into the water ahead of the boat, wherein the predictor means comprises a plurality of fixed contacts mounted one above another on said predictor arm, a movable contact associated with and insulated from each of said fixed contacts and a light spring adapted to hold away each of said movable contacts from its associated fixed contact, said movable contacts being exposed to the effect of the movement of the boat through the water whereby the dynamic pressure caused by such movement may overcome the thrust of said spring to allow a movable contact to move against a fixed contact, whereby a signal may be transmitted to the actuating mechanism; and wherein the actuating mechanism comprises a fluid actuated friction clutch having two driving members adapted to rotate in opposite directions, a clutch plate interposed between said driving members and adapted to be driven by one of said driving members, and means for connecting said clutch plate to said hydrofoil, whereby movement of said clutch plate varies the angle of attack of said hydrofoil.

33. Apparatus as claimed in claim 1 and including a predictor arm adapted to project forwardly from the boat and to plunge into the water ahead of the boat, wherein the predictor means comprises a plurality of contact pairs insulated from each other and mounted one above another on the outside of said predictor arm, each of said contact pairs being part of an electric circuit normally open and connected to said actuating means, said circuit being adapted to close upon immersion of a contact pair in water, whereby a signal is transmitted to the hydrofoil actuating mechanism; and wherein the actuating mechanism comprises a cylinder, a piston adapted to be moved in either direction in said cylinder by fluid pressure, and incidence command means for joining said piston to the hydrofoil whereby movement of said piston may vary the angle of attack of the hydrofoil.

34. Apparatus as claimed in claim 1 and including a predictor arm adapted to project forwardly from the boat and to plunge into the water ahead of the boat; wherein the predictor means comprises a plurality of contact pairs insulated from each other and mounted one above another on the outside of said predictor arm, each of said contact pairs being part of an electric circuit normally open and connected to said actuating means, said circuit being adapted to close upon immersion of a contact pair in water whereby a signal is transmitted to the hydrofoil actuating mechanism and wherein the actuating mechanism comprises an electric slip coupling, said coupling including two flywheels adapted to be rotated in opposite directions and having excitation windings, a driven rotor interposed between said flywheels, means for connecting said rotor to the hydrofoil, whereby when said rotor is driven by one of said flywheels the angle of attack of the hydrofoil may be varied.

35. Apparatus as claimed in claim 1 and including a predictor arm adapted to project forwardly from the boat and to plunge into the water ahead of the boat; wherein the predictor means comprises a plurality of contact pairs insulated from each other and mounted one above another on the outside of said predictor arm, each of said contact pairs being part of an electric circuit normally open and connected to said actuating means, said circuit being adapted to close upon immersion of a contact pair in water, whereby a signal is transmitted to the hydrofoil actuating mechanism; and wherein the actuating mechanism comprises an hydraulic slip coupling, said coupling including two flywheels adapted to be rotated in opposite directions as driving members, a driven rotor interposed between said flywheels and means connecting said rotor to the hydrofoil whereby when said rotor is driven by one of said flywheels the angle of attack by the hydrofoil may be varied.

36. Apparatus as claimed in claim 1 and including a predictor arm adapted to project forwardly from the boat and to plunge into the water ahead of said boat; wherein the predictor means comprises a plurality of contact pairs insulated from each other and mounted one above another on the outside of said predictor arm, each of said contact pairs being part of an electric circuit normally open and connected to the actuating means, said circuit being adapted to close upon immersion of a contact pair in water, whereby a signal is transmitted to the hydrofoil actuating mechanism; and wherein the actuating mechanism comprises a fluid actuated friction clutch having two driving members adapted to rotate in opposite directions, a clutch plate interposed between said driving members and adapted to be driven by one of said driving members, and means for connecting said clutch plate to the hydrofoil whereby movement of said clutch plate varies the angle of attack of the hydrofoil.

37. Apparatus as claimed in claim 1 including a predictor arm adapted to project forwardly from the boat and to plunge into the water ahead of the boat; and wherein the predictor means comprises two electrodes secured to said predictor arm; and wherein the actuating mechanism comprises a cylinder, a piston adapted to be moved in either direction in said cylinder by fluid pressure, and incidence command means for joining said piston to the hydrofoil whereby movement of said piston may vary the angle of attack of the hydrofoil.

38. Apparatus as claimed in claim 1 including a predictor arm adapted to project forwardly from the boat and to plunge into the water ahead of the boat, wherein the predictor means comprises two electrodes secured to said predictor arm; and wherein the actuating mechanism comprises an electric slip coupling, said coupling including two flywheels adapted to be rotated in opposite directions and having excitation windings, a driven rotor interposed between said flywheels and means for connecting said rotor to the hydrofoil whereby when said rotor is driven by one of said flywheels the angle of attack of the hydrofoil may be varied.

39. Apparatus as claimed in claim 1 including a predictor arm adapted to project forwardly from the boat and to plunge into the water ahead of the boat; wherein the predictor means comprises two electrodes secured to said predictor arm; and wherein the actuating mechanism comprises an hydraulic slip coupling, said coupling including two flywheels adapted to be rotated in opposite directions as driving members, a driven rotor interposed between said flywheels and means for connecting said rotor to the hydrofoil, whereby when said rotor is driven by one of said flywheels the angle of attack of the hydrofoil may be varied.

40. Apparatus as claimed in claim 1 including a predictor arm adapted to project forwardly from the boat and to plunge into the water ahead of the boat, wherein the predictor means comprises two electrodes secured to said predictor arm; and wherein the actuating mechanism comprises a fluid actuated friction clutch having two driving members adapted to rotate in opposite directions, a clutch plate interposed between said driving members and adapted to be driven by one of said driving members, and means for connecting said clutch plate to the hydrofoil, whereby movement of said clutch plate varies the angle of attack of the hydrofoil.

NEIL WILLIAM GARDINER.

REFERENCES CITED

The following references are of record in the file of this patent:

UNITED STATES PATENTS

| Number | Name | Date |
|---|---|---|
| 1,186,816 | Meacham | June 13, 1916 |
| 2,176,469 | Moueix | Oct. 17, 1939 |
| 2,387,907 | Hook | Oct. 30, 1945 |
| 2,457,393 | Muffly | Dec. 28, 1948 |

Certificate of Correction

Patent No. 2,576,716                        November 27, 1951

NEIL WILLIAM GARDINER

It is hereby certified that error appears in the printed specification of the above numbered patent requiring correction as follows:

Column 12, line 21, for "coil 133" read *coil 153*; column 13, line 3, for "pivots 172" read *pivots 170*; column 15, line 59, for "varying" read *vary*; same line, for "attach" read *attack*;

and that the said Letters Patent should be read as corrected above, so that the same may conform to the record of the case in the Patent Office.

Signed and sealed this 22nd day of April, A. D. 1952.

[SEAL]

THOMAS F. MURPHY,
*Assistant Commissioner of Patents.*